United States Patent Office 3,814,614
Patented June 4, 1974

3,814,614
LIGHTWEIGHT STRUCTURAL CONCRETE
Stefan Kraemer, Essen, Michael Seger, Krefeld-Linn, and Alois Seidl, Thurnstein, Post Lam, Germany, assignors to Wasag Chemie GmbH, Munich, Germany
No Drawing. Filed Apr. 25, 1972, Ser. No. 247,381
Claims priority, application Germany, Apr. 28, 1971, P 21 20 775.0
Int. Cl. C04b 7/02, 35/02
U.S. Cl. 106—97    5 Claims

ABSTRACT OF THE DISCLOSURE

Structural lightweight concrete having a filler/cement weight ratio of about (350±100):(650±300) and a water/cement weight ratio of about 0.65±0.25, the improvement comprising lightweight fillers comprising:
(a) strongly absorbent, foamed alkali metal silicate glass, concrete compatible products of a smooth unbroken surface, of an approximately spherical or ellipsoidal shape in grain sizes of 0.1-6 mm., preferably 0.1-4.0 mm., and bulk densities of 0.15±0.10 kilograms per cubic decimeter; and
(b) very hard, low absorbent, foamed or bloated or otherwise made porous inorganic lightweight additives in grain sizes of 4-25 mm. and bulk densities of 0.6±0.2 kilograms per cubic decimeter, wherein the volume ratio of (a) to (b) is about 1:9 to 9:1.

BACKGROUND OF THE INVENTION

The field of the invention is coating or plastic compositions of inorganic settable ingredients of Portland cement containing silica aggregates.

The state of the art of the raw material as used in the present invention may be ascertained by reference to the Kirk-Othmer "Encyclopedia of Chemical Technology," 2nd Ed., (1964), Vol. 4, pages 684-710 under the section "Cement," and by reference to U.S. Pats. 3,184,371 of Seidl; 3,261,894 of Seidl; and 3,652,310 of Kraemer et al., which issued May 18, 1965; July 19, 1966; and Mar. 28, 1972 respectively. These disclosures are incorporated herein.

It is known to the art to produce an inherently dense structural lightweight concrete which can be reinforced by binding with a cement paste bloated or foamed mineral products having a suitable screening characteristic. These mineral products are of a silicate, clay, and/or carbonate character, such as bloated shale, bloated clay, etc., or granules from waste products, such as flue ash, slag pumice, etc., and they may also be sintered or steam-hardened. In the case of lightweight concrete, the additives of gravel and sand usual in high density concrete are replaced entirely or partially by the above-mentioned lightweight substances and, otherwise, the procedures used in concrete technology are retained unchanged.

The bulk densities of the lightweight additives are all above 0.4 kg./dm.$^3$ (kilograms per cubic decimeter), generally between 0.6–0.8 kg./dm.$^3$, with a portion above 0.8 kg./dm.$^3$. The grain apparent densities are approximately twice these values.

With the decreasing bulk densities of the additives, not only the concrete densities are reduced, but also the compressive strengths, especially in the case of the coarse additives. The decreased grain density of the fine additives, however, has only a minor effect, or hardly any effect at all, on the strength of the lightweight concrete when these fine additives are combined with hard coarse additives. However, when heavier, coarser additives are combined with lighter, finer lightweight additives, segregation of the concrete mass takes place. This segregation becomes the more pronounced, the greater the density difference of the additives and the lower the concrete consistency. Thus, it is impossible in the case of wide density disparity of the additives and poor consistency, to be sure that the requirements for homogeneity of a structural lightweight concrete can be satisfied.

For a great variety of reasons, the interest in lightweight concrete having density as low as possible and a compressive strength as high as possible, is great, primarily because the thermal insulating characteristics increase with decreasing density and because of the load reduction obtained in buildings. It has not been possible to produce, by the methods known heretofore, a dense structural lightweight concrete of a high compressive strength with densities of below 1200 kg./m.$^3$ (kilograms/cubic meter). This can be ascertained from the fact that the "Preliminary Guidelines for the Manufacture and Testing of Reinforced Lightweight Concrete," published in August of 1967, by the German Committee for Reinforced Concrete permit only the following apparent density classifications for structural lightweight concrete:

| Apparent density classification (nominal apparent density): | Test results kg./dm.$^3$ |
|---|---|
| 1.30 | 1.20–1.40 |
| 1.50 | 1.41–1.60 |
| 1.70 | 1.61–1.80 |
| 1.90 | 1.81–2.00 |

The German Committee for Reinforced Concrete has heretofore expressly disallowed lightweight concretes of an apparent density of below 1.20 kg./dm.$^3$ for use as lightweight concrete, because it has been assumed that in such concrete compositions it is impossible to be reasonably sure that a dense concrete structure will be obtained.

SUMMARY OF THE INVENTION

Having in mind the limitations of the prior art, it is therefore an object of the present invention to prepare a lightweight structural concrete wherein this "density threshold" is substantially depressed below 1.20 kg./dm.$^3$, without endangering the density of the concrete and without appreciably reducing the compressive strength. This is accomplished by the combination, as additives, of strongly absorbent, foamed, alkali metal silicate glass, concrete-compatible products of a smooth unbroken surface, having an approximately spherical or ellipsoidal shape with grain sizes of 0.1-6 mm., preferably 0.1–4.0 mm., and with bulk densities of 0.15±0.10 kg./dm.$^3$, combined with very hard, low-absorbent, porous (foamed, bloated or otherwise) inorganic lightweight additives in grain sizes of 4–25 mm. and bulk densities of 0.6±0.2 kg./dm.$^3$; and by processing this combination, according to the state of the art of concrete technology, with a sufficient amount of cement and water at a water-cement ratio of 0.65±0.25 and within the standard, in most cases steadily rising screening characteristic curve for additives. The shaping by means of concrete forms by shaking, with and without a top load, and the setting take place in a conventional manner.

DESCRIPTION OF THE PREFERRED EMBODIMENTS

In spite of the great differences in density between the finer, extremely lightweight additives and the coarser, hard and heavier additives, no separation of the mix occurs during the manufacture of the concrete and during casting, when the additives mentioned above have a strong absorbability with respect to water. Consequently, in a preferred embodiment of this invention, the foamed, inorganic, concete-compatible products absorb, after saturation under water for one hour and drip-drying for one-half hour, more than 15 percent by weight.

For reasons of space filling, the shape of the lightweight additives of small granular size of 0.1–6 mm., preferably 0.1–4 mm., is of utmost importance in order to obtain the structural lightweight concrete of this invention with a low density.

Absorbent inorganic products with a density of 0.15±0.1 kg./dm.$^3$ as required for the small grain additive, but a non-smooth surface, e.g. perlites, vermicuites etc., are, due to their uneven shape and an insufficient space-filling, not suitable for the production of the structural lightweight concrete of this invention. On the other hand, concrete-compatible, inorganic, foamed, granular products having a smooth or slightly rough surface, of a spherical or ellipsoidal configuration with a space filling of more than 45 percent and a high absorbency, wherein the absorbency of the individual grain can be somewhat different, may be used.

The lightweight granulated foamed materials produced according to U.S. Pats. 3,184,371 and 3,261,894 of Alois Seidl, which issued May 18, 1965 and July 19, 1966 respectively, and German Pat. 1,671,266 (corresponding to U.S. Patent application Ser. No. 724,634 and now abandoned) have proved to be most advantageous.

According to U.S. Pats. 3,184,371 and 3,261,894, granular fillers are produced by:

(a) dissolving a fibrous inorganic silicate in aqueous alkali metal silicate solution in the proportion of 0.02–0.7 or 0.02–0.8 parts by weight fibrous inorganic silicate to one part of the aqueous alkali metal silicate;
(b) drying the solution;
(c) granulating the product; and
(d) heating the granules to 700–900° C.

German Pat. 1,671,243 (corresponding to U.S. patent application Ser. No. 56,075) disclose in place of step (d) above;

(d) coating the granules with a refractory substance, such as lime; and
(e) heating the coated product between about 600–1000° C.

It is also possible to employ especially lightweight alkali silicate particles prepared as disclosed in German unexamined published application 1,804,137. In order to avoid shrinking in the preparation of these particles, blowing agents were added when the particles were in the plastic condition. These blowing agents split off gases at 400–700° C. or vaporize or are subject to gas-liberating reactions. Subsequent to a predrying step, the substance was foamed at 500–700° C.

Furthermore suitable are the lightweight granulated materials prepared as disclosed in U.S. Pat. 3,652,310 of Kraemer et al., which issued Mar. 28, 1972. According to Kraemer et al., foamed glass particles are prepared by:

(a) dissolving about 0.02–0.7 parts by weight of fibrous inorganic silicate in one part by weight of an aqueous alkali metal silicate solution;
(b) evaporating the mixture to a water content of about 5–20 percent by heating;
(c) granulating the dried material to a particle size between about 0.5–20 mm.;
(d) coating the granulated material with a dispersion of a high melting inorganic compound having a melting point between about 1200 and 2500° C.; and
(e) heating the coated material between about 600 to 1000° C. to produce the foamed glass particles.

The glass particles are mixed with lime and water, molded to form a shaped body and conditioned in a saturated water vapor atmosphere to produce a calcium hydrosilicate element.

These lightweight additives, due to their small grain size, light weight, controllable absorbency, concrete compatibility, and smooth, predominantly round granular shape, are easily combined with the substantially heavier, hard, little absorbable larger granulated materials based on bloated clay, bloated shale, flue ash, slag, etc., and thereby a structural lightweight concrete is attained having substantially improved properties as compared to those concretes known heretofore. Since the surface of these small granules is hardened by melting the sequestrants, due to the manner in which the granules are manufactured, the customary abrasion during the mixing periods is avoided.

The gap in the screening characteristic of the additives for the structural lightweight concrete according to this invention, of 0.06–0.1 mm. is closed by minor percentages of quartz powder or concrete-compatible flue ash.

As examples of the lightweight structural concrete of this invention, the concrete compositions are set forth, as compiled in the following examples, wherein the procedure is that disclosed in accordance with the Preliminary Guidelines and the Preliminary Pamphlet I of the German Committee for Reinforced Concrete (in the editions of August 1967 and July 1968):

EXAMPLE A

The strongly absorbent, foamed, inorganic, concrete-compatible products of a smooth unbroken surface having an approximately spherical or ellipsoidal shape in grain sizes of 0.1–6 mm., preferably 0.1–4.0 mm., with bulk densities of 0.15±0.10 kg./dm.$^3$ as used in the examples reported in Tables I and II as follows are prepared by dissolving fibrous or powdered silicate or oxidic materials in aqueous alkali metal silicate solution in the proportion of 0.02 to 0.7:1 parts by weight, drying the solution, granulating the product, coating the granules with a refractory substance, such as lime, and heating the coated product between about 600–1000° C.

EXAMPLE B

The very hard, low-absorbent, foamed or bloated or otherwise made porous, inorganic lightweight additives in grain sizes of 4–25 mm. and bulk densities of 0.6±0.2 kg./dm.$^3$ as used in the examples reported in Tables I and II as follows are prepared by treating well refined red mud with an organic blowing agent such as sugar, molasses or powdered carbon, pressing the treated mud through a perforated screen by a worm gear press, cutting the pressed strands into short pieces, drying the small cylinders to a water content of about 5 to 10 percent and expanding the granules in an oven at a temperature of about 1000 to 1400° C. and cooling to room temperature.

In the compositions reported in the Tables, the weight ratios of the components vary as follows:

water/cement ratio=0.65±0.35
electrostatic filler ash/cement ratio=(0—0.4): 1 kg.
sand/cement ratio=(0—0.7): 1 kg.
filler (a) bulk density 0.15±0.10 kg./dm.$^3$/cement ratio =(0.1—1.0): 1 kg.
filler (b) bulk density 0.6±0.3 kg./dm.$^3$/cement ratio =0.1—2.0): 1 kg.

One cubic meter of the lightweight concrete contains about 250–320 liters of water and cement and about 750–680 liters of filler.

According to the examples shown in Table I, foamed glass granules of the indicated grain size and bulk density with an absorbency of 70 percent by weight are mixed with granulated bloated clay of the indicated grain size and bulk density with an absorbency of 7 percent by weight, and moistened with water. To this mixture is added a cement glue, consisting of cement PZ 450, precipitate from an electrostatic filter, and water. The mixture of consistency K2 is poured into concrete forms under constant agitation. After 28 days, this structural lightweight concrete exhibits the values for density, compressive strength, and λ-value as set forth in Table I.

TABLE I

|  | Grain density | Bulk density | Example 1 | | | | Example 2 | | | | Example 3 | | | |
| --- | --- | --- | --- | --- | --- | --- | --- | --- | --- | --- | --- | --- | --- | --- |
|  |  |  | Kg. | Grain volume 1 | Bulk factor 1 | Vol. percent | Kg. | Grain volume 1 | Bulk factor 1 | Vol. percent | Kg. | Grain volume 1 | Bulk factor 1 | Vol. percent |
| Cement PZ 450 | 3.12 |  | 350 | 112 |  | (¹) | 300 | 96 |  | (²) | 275 | 88 |  | (³) |
| Electrostatic filter ash | 2.5 |  | 100 | 40 |  | (¹) | 100 | 40 |  | (²) | 100 | 40 |  | (³) |
| Hydration water | 1.0 |  | 180 | 180 |  | (¹) | 168 | 168 |  | (²) | 154 | 154 |  | (³) |
| Core water | 1.0 |  | 42 |  |  | (¹) | 61 |  |  | (²) | 100 |  |  | (³) |
| Concrete liquefier |  |  | 0.7 |  |  | (¹) | 0.6 |  |  | (²) | 0.55 |  |  | (³) |
| Σ₁ |  |  | 672 | 322 |  |  | 629 | 304 |  |  | 629 | 282 |  |  |
| Sand 0/1 | 2.6 | 1.6 | 169 | 65 | 105 | 10 | 182 | 70 | 109 | 10 | 187 | 72 | 112 | 10 |
| Bloated clay: |  |  |  |  |  |  |  |  |  |  |  |  |  |  |
| 3/7 | 0.9 | 0.50 | 235 | 262 | 470 | 40 |  |  |  |  |  |  |  |  |
| 7/15 | 0.8 | 0.45 | 104 | 130 | 231 | 20 | 278 | 347 | 618 | 50 | 144 | 180 | 320 | 25 |
| Foamed glass granules: |  |  |  |  |  |  |  |  |  |  |  |  |  |  |
| 0/2 | 0.22 | 0.11 | 14 | 65 | 127 | 10 | 31 | 139 | 282 | 20 | 55 | 250 | 500 | 35 |
| 1/4 | 0.22 | 0.10 | 28 | 130 | 280 | 20 | 30 | 139 | 300 | 20 | 47 | 215 | 470 | 30 |
| Σ₂ |  |  | 550 | 652 |  | 100 | 521 | 695 |  | 100 | 433 | 717 |  | 100 |
| Densities for— |  |  |  |  |  |  |  |  |  |  |  |  |  |  |
| Raw concrete, kg./l | | | 1,222 | 984 | | | 1,150 | 999 | | | 1,062 | 999 | | |
| Dry concrete, kg./l | | | 1,140 | | | | 988 | | | | 918 | | | |
| Nominal value, kg./l | | | 1,200 | | | | 1,040 | | | | 960 | | | |
| Compressive strength, kp./cm.³ | | | 250 | | | | 150 | | | | 80 | | | |
| Thermal conductivity λ (calculated) = thermal conductivity (measured) plus 20% | | | 0.43 | | | | 0.35 | | | | 0.30 | | | |

¹ Water 0.4, cement 0.64.   ² Water 0.53, cement 0.73.   ³ Water 0.56, cement 0.92.

By replacing the foamed glass granules in Examples 1-3 as tabulated in Table I by a conventional lightweight additive within the same granular spectrum, for example bloated shale, Examples 1a-3a are obtained as tabulated in Table II.

TABLE II

|  | Grain density | Bulk density | Example 1a | | | | Example 2a | | | | Example 3a | | | |
| --- | --- | --- | --- | --- | --- | --- | --- | --- | --- | --- | --- | --- | --- | --- |
|  |  |  | Kg. | Grain volume 1 | Bulk factor 1 | Vol. percent | Kg. | Grain volume 1 | Bulk factor 1 | Vol. percent | Kg. | Grain volume 1 | Bulk factor 1 | Vol. percent |
| Cement PZ 450 | 3.12 |  | 350 | 112 |  |  | 300 | 96 |  |  | 275 | 88 |  |  |
| Electrostatic filter ash | 2.5 |  | 100 | 40 |  |  | 100 | 40 |  |  | 100 | 40 |  |  |
| Hydration water | 1.0 |  | 180 | 180 |  |  | 168 | 168 |  |  | 154 | 145 |  |  |
| Core water | 1.0 |  | 15 |  |  |  | 20 |  |  |  | 30 |  |  |  |
| Concrete liquefier |  |  | 0.7 |  |  |  | 0.6 |  |  |  | 0.55 |  |  |  |
| Σ₁ |  |  | 645 | 322 |  |  | 588 | 304 |  |  | 559 | 282 |  |  |
| Sand 0/1 | 2.6 | 1.6 | 169 | 65 | 105 | 10 | 182 | 70 | 109 | 10 | 187 | 72 |  | 10 |
| Bloated clay: |  |  |  |  |  |  |  |  |  |  |  |  |  |  |
| 3/7 | 0.9 | 0.5 | 235 | 262 | 470 | 40 |  |  |  |  |  |  |  |  |
| 7/15 | 0.8 | 0.45 | 104 | 130 | 231 | 20 | 278 | 347 | 618 | 50 | 144 | 180 |  | 25 |
| Bloated shale 0/4 | 1.65 | 0.90 | 322 | 195 | 358 | 30 | 459 | 278 | 510 | 40 | 767 | 465 |  | 65 |
| Σ₂ |  |  | 830 | 652 |  | 100 | 919 | 695 |  | 100 | 1098 | 717 |  | 100 |
| Densities for: |  |  |  |  |  |  |  |  |  |  |  |  |  |  |
| Raw concrete | | | 1,475 | 984 | | | 1,507 | 999 | | | 1,657 | 999 | | |
| Dry concrete | | | 1,420 | | | | 1,440 | | | | 1,583 | | | |
| Nominal value | | | 1,500 | | | | 1,500 | | | | 1,600 | | | |
| Thermal conductivity λ (calculated) = thermal conductivity (measured) plus 20% | | | 0.60 | | | | 0.60 | | | | 0.68 | | | |

In Table III which follows, the characteristic data of the concretes are compared:

With an increasing proportion of foamed glass granules in the fine-grained range, the dry density of the concrete is reduced to below 1000 kg./m.³, whereas replacing the foamed glass by bloated shale results in increasingly higher densities up to 1600 kg./m.³.

The values for the thermal conductivity are impaired in the same manner.

TABLE III

| | EXAMPLE | | | | | |
| --- | --- | --- | --- | --- | --- | --- |
| | 1 | 1a | 2 | 2a | 3 | 3a |
| Raw concrete density | 1,222 | 1,475 | 1,150 | 1,507 | 1,062 | 1,657 |
| Dry concrete density | 1,140 | 1,420 | 988 | 1,440 | 918 | 1,583 |
| Nominal value, kg./m.³ | 1,200 | 1,500 | 1,040 | 1,500 | 960 | 1,600 |
| Difference | ~ | 0.300 | ~ | 0.450 | ~ | 0.650 |
| λ values | 0.43 | 0.60 | 0.35 | 0.60 | 0.30 | 0.68 |

What is claimed is:

1. In a lightweight structural concrete composition having a water/cement weight ratio of 0.65±0.25 and lightweight filler/cement weight ratio of (350±100):(650±300) the improvement comprising said lightweight filler comprising:

(a) strongly absorbent, foamed, alkali metal silicate glass, concrete-compatible products having a smooth unbroken surface of an approximately spherical or ellipsoidal shape in grain sizes of about 0.1-6 mm. and a bulk density of about 0.15±0.10 kilograms per cubic decimeter; and (b) very hard, low absorbent, porous, inorganic lightweight additives in grain sizes of about 4-25 mm. and bulk densities of about 0.6±0.2 kilograms per cubic decimeter and wherein the volume ratio of (a)/(b) is about 1:9 to 9:1.

2. The lightweight structural concrete composition according to claim 1, characterized in that the absorbency of the foamed, alkali metal silicate glass, concrete-compatible products, after being fully saturated with water for one hour and being drip-dried for one-half hour, amounts to more than 15 percent by weight.

3. The lightweight structural concrete composition of claim 1, wherein the grain size of (a) is about 0.1-4.0 mm.

4. The lightweight structural concrete composition of claim 3, wherein component (a) is prepared by:

(a) dissolving about 0.02 to 0.7 parts by weight of fibrous inorganic silicate in one part by weight of an aqueous alkali metal silicate solution;

(b) evaporating the mixture to a water content of about 5–20 percent by weight;
(c) granulating the dried material to a particle size between about 0.5–20 mm.;
(d) coating the granulated material with a dispersion of a high melting inorganic compound having a melting point between about 1200 to 2500° C.; and
(e) heating the coated material between about 600 to 1000° C. producing foamed glass particles.

5. Lightweight structural concrete prepared from the composition of claim 1, having a density less than 1.20 kilograms per cubic decimeter.

References Cited
UNITED STATES PATENTS
3,652,310   3/1972   Kraemer et al. _____ 106—120

FOREIGN PATENTS
1,219,948   1/1971   Great Britain.

DELBERT E. GANTZ, Primary Examiner
S. L. BERGER, Assistant Examiner

U.S. Cl. X.R.
106—64